United States Patent [19]

Salner

[11] Patent Number: 4,781,128
[45] Date of Patent: Nov. 1, 1988

[54] COMBUSTION APPARATUS HAVING A DEFINED GEOMETRIC CONFIGURATION

[76] Inventor: Samuel Salner, 8 Gluskin St., Rishon LeZion 75263, Israel

[21] Appl. No.: 2,851

[22] Filed: Jan. 13, 1987

[30] Foreign Application Priority Data

Jan. 31, 1986 [IL] Israel .................................. 77753

[51] Int. Cl.⁴ .................................. F23K 3/00
[52] U.S. Cl. .................................. 110/102; 44/14; 44/541; 110/347
[58] Field of Search ................ 110/218, 223, 233, 235, 110/263, 102; 44/1 C, 1 E, 2, 4, 6, 14, 34, 35, 36, 41

[56] References Cited

U.S. PATENT DOCUMENTS

| | | | |
|---|---|---|---|
| 3,034,672 | 5/1962 | Roberts | 44/38 |
| 4,060,396 | 11/1977 | Burton | 44/36 X |
| 4,191,534 | 3/1980 | Bostic | 44/6 |
| 4,243,393 | 1/1981 | Christian | 44/38 X |
| 4,308,032 | 12/1981 | Benson | 44/1 E |
| 4,414,906 | 11/1983 | Hartouni | 110/102 X |

*Primary Examiner*—Steven E. Warner
*Attorney, Agent, or Firm*—Ladas & Parry

[57] ABSTRACT

A combustible element has a defined geometrical configuration and comprises a fragmented non-consolidated content of combustible material and a combustible enclosure for the material. A plurality of such elements define in a combustion chamber a channel having a geometrically defined configuration, which provides the combustion area and access for the air utilized in the combustion of the fragmented content of the element and of combustible gases evolved during combustion of the combustible material, as well as egress means for gaseous combustion products. Apparatus for the combustion of such elements is preferably provided with a heat exchanging surface defined by a smoke chamber laterally surrounding the combustion chamber. High combustion efficiency and other advantages are stated.

8 Claims, 3 Drawing Sheets

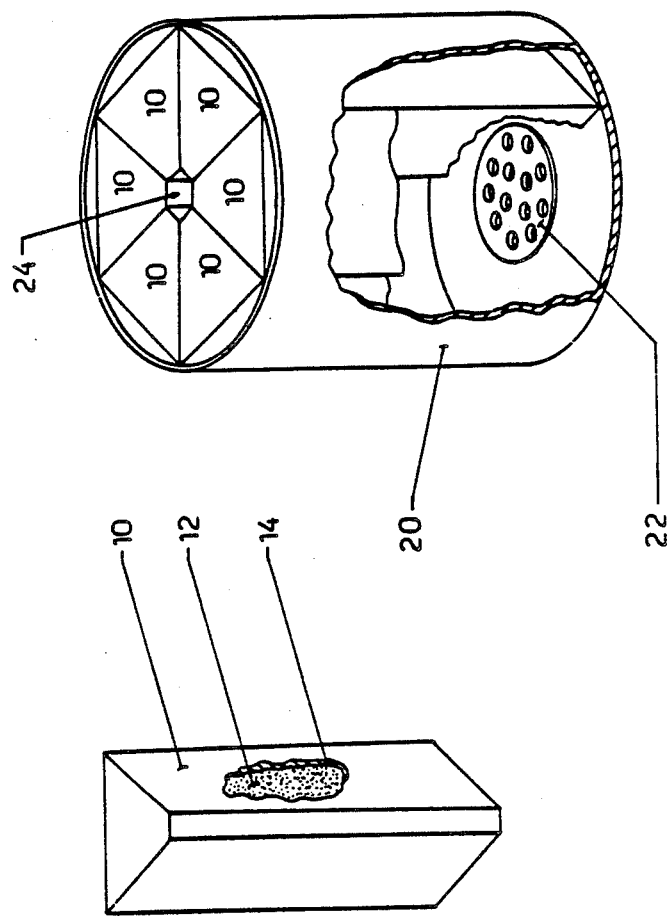

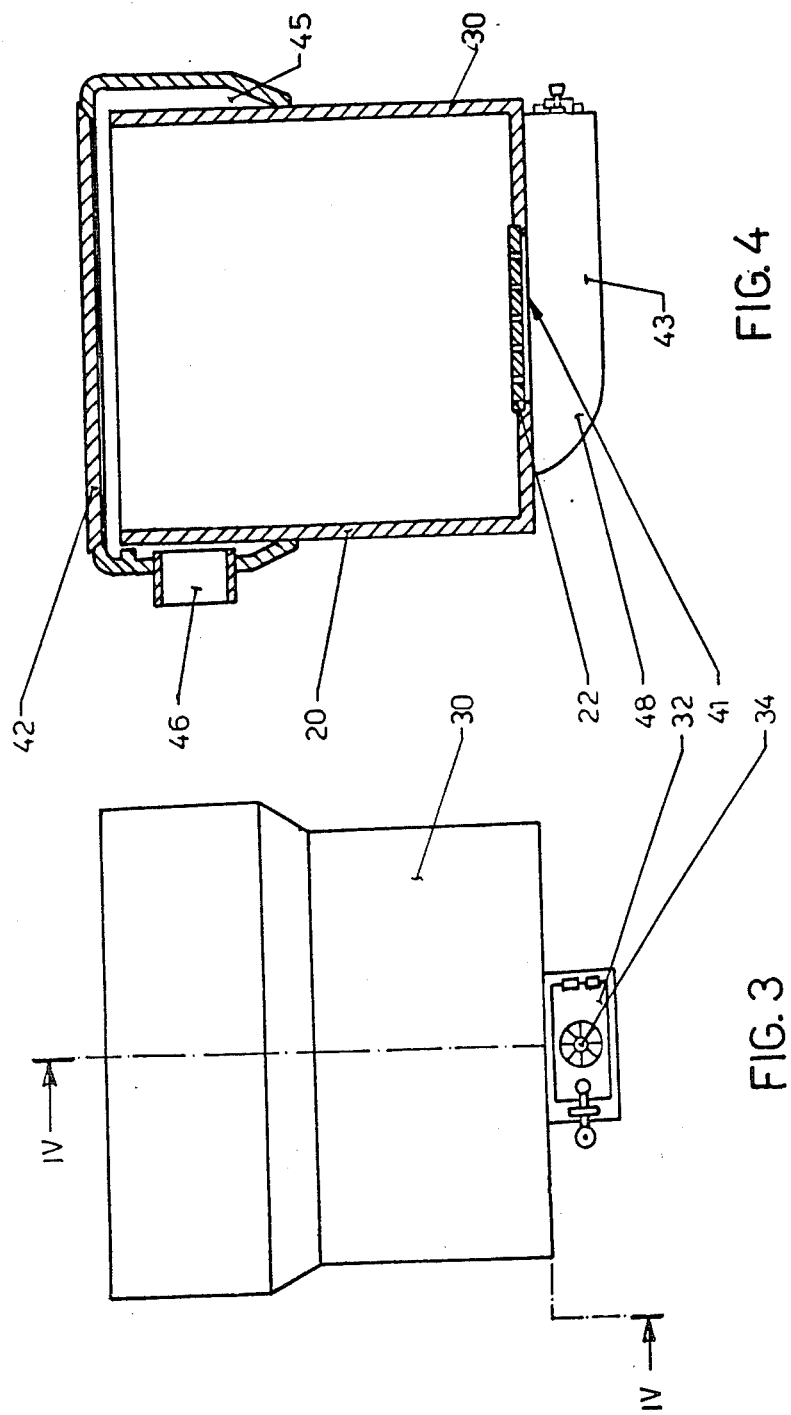

COMBUSTION APPARATUS HAVING A DEFINED GEOMETRIC CONFIGURATION

FIELD OF THE INVENTION

The present invention relates to the generation of heat by burning fragmented combustible materials, and more particularly to a combustible element including fragmented contents, to combustion apparatus for burning the combustible element, and to a method of burning the fragmented combustible materials.

BACKGROUND OF THE INVENTION

Various types of manufactured combustible elements are known, including briquettes or "sawdust logs" formed from bound, consolidated wood materials such as chips and sawdust. It is a particular characteristic of such sawdust logs or briquettes that they no longer have the burning characteristics of fragmented wood, but rather tend to burn relatively quickly and over a short duration in a hot fire, which reduces the efficiency of the stove, shortens the life and otherwise abuses both the stove and the flue.

The most relevant examples of the prior art known to applicant appear in U.S. Pat. Nos. 4,308,032; 2,222,250; 4,060,396; 3,947,255, 3,726,651 and 4,243,394.

U.S. Pat. No. 4,308,032 describes a compacted sawdust log of cylindrical configuration which is intended to be handmade by the user. There is no teaching of the provision of a combustion channel.

U.S. Pat. No. 2,222,250 describes a cylindrically laminated briquette formed of vegetable fiber, such as wood, bond by inherent resins. Here also there is no teaching of the provision of a combustion channel.

U.S. Pat. No. 4,060,396 describes a briquette formed of compacted wood particles in the form of interlocked disc-shaped wafers and having a central channel. The briquette is highly compressed and bound by natural resins and is intended for quick burning.

U.S. Pat. No. 3,947,255 describes a method of manufacturing consolidated elements based on bark and binders and having the configuration of a sector of a circle.

U.S. Pat. No. 3,726,651 also describes a consolidated burning element having a central bore. U.S. Pat. No. 4,243,394 illustrates a channeled consolidated element. FIG. 3 of this Patent illustrates a preferred packaging arrangement of such elements. U.S. Pat. Nos. 57,890 and 4,243,393 also illustrate combustion elements having a central bore.

SUMMARY OF THE INVENTION

The present invention provides a solution to the problem of using fragmented wood such as sawdust, chips and the like for heat generation and is also able to exploit, in addition or alternatively to fragmented wood, any other cellulosic material such as fragmented cotton stalks, corn cobs and the like, as well as any other suitable combustible materials, e.g. fragmented trash.

The present invention provides improved combustion apparatus and method of producing heat from such combustion apparatus as compared with prior art manufactured combustible elements and even as compared with ordinary firewood.

There is thus provided in accordance with one aspect of the invention, combustion apparatus comprising a plurality of combustible elements having a defined geometrical configuration and including fragmented non-consolidated combustible material and a combustible enclosure for the combustible material, the combustion apparatus being characterized in that it defines a channel having a geometrically defined configuration, which channel provides a combustion region, passage for the air utilized in the combustion of the fragmented combustible material of the at least one element and for combustible gases evolved during combustion of the combustible material, and egress for gaseous combustion products.

According to a preferred embodiment of the present invention, the combustion apparatus comprises a plurality of segments which when joined in a particular configuration, define an axially symmetric body having a channel formed therein.

The combustible enclosure may comprise a coating formed at the outer surface only of said element; such a coating may in turn comprise a thermoplastic resin. Alternatively or additionally, the combustible enclosure (or part of it) may comprise a wrapping material, such as paper, cardboard and the like.

The method of producing heat provided by the present invention differs from the methods provided by prior art methods by the fact that it comprises the step of arranging in a combustion chamber a plurality of elements so as to form in a combustion chamber a channel which, during combustion, provides the access for the air and also the combustion area for the elements and for the combustible gases evolved in the channel, the channel being bordered continuously during combustion by fragmented combustible material, so that an extremely high surface of combustible material undergoing combustion is maintained, the result being a highly efficient, controlable long duration combustion. The combustible elements provided by this invention for the above described method differ from the prior art combustible elements by possessing a defined geometrical configuration which keeps them in place in the combustion chamber during combustion, and having fragmented non-consolidated contents of combustible material necessary for the above mentioned method. The above characteristics of the method and of the element will be better understood from the detailed description of the preferred embodiment.

The combustible element in accordance with the invention may be prepared by a process comprising compression of fragmented combustible material, while maintaining throughout the process the fragmented non-consolidated nature of the element's content. Alternatively, the element may be prepared without compression of the fragmented combustible material.

While the combustion apparatus according to the invention may possess any suitable geometrical configuration, it preferably has the shape of an axially symmetric body with an internal bore which provides the channel. As noted above, the combustion apparatus comprises a plurality of elements, each defining a disk-like portion or sector thereof.

In a further aspect of the invention, there is provided a method of producing heat from fragmented combustible material which comprises the steps of providing in a combustion chamber combustion apparatus comprising a plurality of fragmented-content combustible elements as defined herein, so as to form in the combustion chamber a channel having a geometrically defined configuration, and effecting combustion of the plurality of elements at the surface thereof bordering the channel, while providing during combustion a flow of air along the channel.

According to still a further aspect of the invention, there is provided a method of producing heat from combustible elements which comprises the steps of arranging in a combustion chamber a plurality of combustible elements having a geometrically defined configuration, so as to form in the combustion chamber an axially symmetric channel having a geometrically defined configuration, and effecting combustion of the plurality of elements at the surface thereof bordering the channel, while providing during combustion a flow of air along the channel.

In yet another aspect of the invention, there is provided a combustion system comprising a combustion chamber containing a plurality of combustible elements as defined herein, which define a channel according to the invention, and apparatus to supply a flow of air through the channel. In this combustion system, the combustion chamber preferably possesses substantially the configuration of the plurality of combustible elements which define the channel, thereby to minimize any free space between the walls defining the chamber and the one or more elements. The combustion system may also be provided with a heat exchanging surface defined by a smoke chamber laterally surrounding the combustion chamber.

In still another aspect of the present invention, therefore, there is provided a combustion system characterized by the fact that it is provided with a heat exchanging surface defined by a smoke chamber laterally surrounding the combustion chamber.

It is to be understood that the fragmented combustible material referred to herein may be, for example, sawdust, chips and the like, any other fragmented cellulosic or combustible material, or any combination of them. Where such material is compressed for the purpose of making the combustible element of the invention, the fragmented non-consolidated nature of the content of the element is still maintained, although mechanical interlocking exists, whereby an extremely high ratio of surface area of fragmented combustible material undergoing combustion to surface area of the combustible element is maintained during combustion.

Where the term "non-consolidated" is used in the definition of the combustible material of the invention, it is intended to convey that the element would not retain its integrity during handling and transportation, in the absence of the combustible enclosure which contributes to maintaining the integrity and shape of the element; the characteristic property of the element is therefore, as stated above, that an extremely high ratio of surface area of fragmented combustible material undergoing combustion to surface area of the combustible element is maintained during combustion. This structure and characteristic property are different from known consolidated combustible elements such as briquettes and "sawdust logs".

BRIEF DESCRIPTION OF THE DRAWINGS

The present invention will be understood and appreciated more fully from the following detailed description taken in conjunction with the drawing in which:

FIG. 1 is a partially cut-away pictorial illustration of a combustible element constructed and operative in accordance with a preferred embodiment of the present invention, which element has the geometrical configuration of a sector of a prism, the latter having a bore along its longitudinal axis;

FIG. 2 is a partially cut-away pictorial illustration of a combustion chamber for burning a plurality of combustible elements, which together define a channel, the elements being of the type illustrated in FIG. 1;

FIG. 3 is a side view illustration of a stove for combustion of the plurality of combustible elements of the type illustrated in FIG. 2;

FIG. 4 is a sectional view taken along the lines IV—IV of FIG. 3;

DETAILED DESCRIPTION OF A PREFERRED EMBODIMENT

Figure 8:
FIG. 8 is a pictorial illustration of a geometrical configuration of a combustible element having the shape of a disk-like portion from a hexagonal prism with a bore along its axis.
Figure 7:
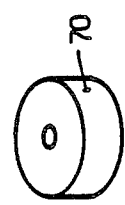
FIG. 7 is a pictorial illustration of a geometrical configuration of a combustible element having the shape of a disk-like portion from a cylinder having a bore along its axis.
Figure 6:
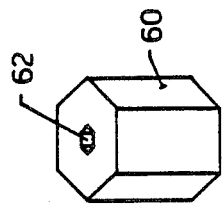
FIG. 6 is a pictorial illustration of a geometrical configuration of a combustible element having the shape of a hexagonal prism with a bore along its axis.
Figure 5:
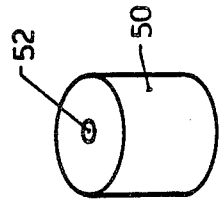
FIG. 5 is a pictorial illustration of a geometrical configuration of a combustible element having the shape of a cylinder with a bore along its axis.
Figure 9:
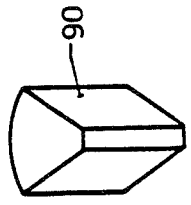
FIG. 9 is a pictorial illustration of a geometrical configuration of a combustible element having the shape of a sector from a cylinder, the latter having a bore along its axis.

Stoves having symmetrical combustion chambers, most commonly vertical cylindrical combustion chambers, are the most adequate for the purposes of the present invention, due to the simple geometrical configuration that they require from the present combustible elements. Suitable combustible elements for use in a vertically symmetrical combustion chamber can be generally divided into two principal groups according to their geometrical configuration: (a) elements having the geometrical configuration of a cylinder 50 with a bore 52, as in FIG. 5, or that of a disk-like portion 70 of such a cylinder, as in FIG. 7, or that of a sector 90 as in FIG. 9; and (b) elements having the geometrical configuration of a prism 60 with a bore 62, as in FIG. 6 (both the prism and the bore in this example having a hexagonal cross-section), or that of a disk-like portion 80 of such a prism, as in FIG. 8, or that of a sector 10 of such a prism, as in FIG. 1. There is a common characteristic of such disk-like portions and sectors that they withstand the necessary criteria of contributing to the continuation and to the total accomplishment of the combustion of the elements in the combustion chamber, by the fact that, thanks to their configuration, the elements keep themselves in their place and maintain the radially burning and enlarging channel.

Figure 11:
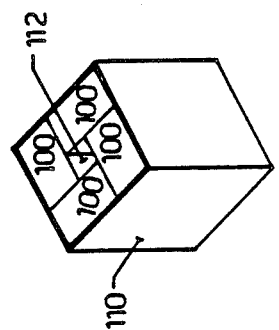
FIG. 11 is a pictorial illustration of a combustion chamber containing a plurality of combustible elements of the type illustrated in FIG. 10, and which together define a channel.
Figure 10:
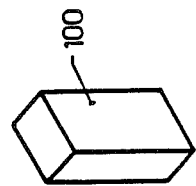
FIG. 10 is a pictorial illustration of a geometrical configuration of a combustible element, which has the shape of a rectangular prism.

It must be mentioned that, in addition to the geometrical configurations aforesaid, the present invention includes embodiments with the fragmented-content combustible element having a geometrical configuration, which, although not a geometrical body with an internal bore, or a sector or disk-like portion of such a geometrical body, is nevertheless such that a plurality of elements may together form the required channel which is located externally of each individual element. One possibility of this aspect of the invention is illustrated in FIG. 11 wherein combustible elements 100 having the geometrical configuration of rectangular prisms as illustrated in FIG. 10 may be fitted together to form in an adequate combustion chamber 110, a geometrically defined channel 112.

It will be appreciated that the combustion chambers of the invention may be manufactured in a suitably limited number of defined sizes, with the object of standardizing the sizes for the fragmented-content combustible element, necessary for large scale industrial production.

Reference is now made to FIGS. 1, 2, 3 and 4 which illustrate the preferred embodiments of the present invention. Thus, there is provided a fragmented-content combustible element 10, having a geometrical configuration of a prism with a trapezic cross section, which is a longitudinal sector of a hexagonal prism with a bore, of which elements a plurality (in this illustration, six) readily fit to define, when arranged in a cylindrical combustion chamber 20 of a heating stove 30, a geometrically defined channel 24, and wherein each combustible element with a defined geometrical configuration comprises a combustible enclosure 14 made from a wrapping material e.g. paper or cardboard (or such an enclosure comprising additionally or alternatively a surface coating) containing a fragmented non-consolidated content 12 of fragmented wood, such as, for example, sawdust, chips and the like, any other fragmented cellulosic material or any other fragmented combustible material, in any combination. The combustible element may be prepared by a process comprising compression of fragmented combustible material, while maintaining throughout the process the fragmented non-consolidated nature of the element's content. Alternatively, the element may be prepared without compression of the fragmented combustible material. In a preferred embodiment, in which the content is non-consolidated sawdust only, the compression ratio is approximately 3 to 1.

In operation, the cover 42 of the heating stove 30 is removed and combustible elements 10 are introduced into combustion chamber 20 and arranged to reconstitute the central vertical channel 24.

Cover 42 is replaced, the door 32 of the ash chamber 48 is opened, some dry paper is introduced under the grating 22 placed over the bottom air inlet 41 of the combustion chamber, and the paper is ignited. The fire passes through grating 22 and in turn ignites the paper or cardboard of those parts of enclosures 14 which represent the walls of channel 24. Door 32 is now closed. Air inlet control 34 found located in door 32 is now at its maximum opening; after a few minutes, the channel's temporary wall has burnt through, and combustion of the fragmented content of the element commences. Air inlet control 34 may now be adjusted to the minimum position, or to an intermediate position, according to the desired combustion duration and burning rate. The especially long duration has already been mentioned as one of the advantages of this invention.

As the combustion continues, the burning wall of the channel represents the combustion surface for the fragmented content of the elements as well as for the combustible gases evolved from the heated fragmented content which pass into the channel. The waste gases pass along the channel, and through the lateral surrounding smoke chamber 45, the important function of which is to provide heat exchange, in addition to the cover 42, and to heat the environment as well as part of the fragmented content which is far from the channel. The waste gases are eventually eliminated through the flue (not shown) fixed to the outlet 46.

The burning channel enlarges radially as the combustion continues, the channel's existence being assured almost till the very end of the combustion, due to the geometrical configuration of the elements which keep them in place and due to the characteristic as regards sawdust and woodchips, of mechanical interlocking, which keeps the fragmented content in place, except the layer which represents momentarily the combustion surface of the channel. Only near the end of combustion is the channel enlarged, at least in some places, to the extent of the wall of the combustion chamber 20, the small amounts of remaining combustible material fall to the bottom of the combustion chamber and there too burn. After the combustion, the cover 42 is lifted, the grating 22 is removed and with a poker or the like, the small amounts of ashes are pulled through the bottom air inlet 41 into the ash chamber 43. The ashes are removed through door 32. Grating 22 and cover 42 are replaced and door 32 is again closed.

It will be appreciated by persons skilled in the art that many modifications and variations may be made in relation to the embodiments which have been particularly descirbed. The present invention is accordingly not limited by what has been particularly shown and described hereinabove or by the illustrations. Rather the scope of the invention is defined by the claims which follow:

I claim:

1. Combustion apparatus having a defined geometrical configuration and comprising a plurality of combustion elements, each comprising:

fragmented non-consolidated combustible material; and combustible enclosure means for said fragmented material, said combustion apparatus being characterized in that it defines a channel having a geometrically defined configuration, which channel provides a combustion region, passage for the air utilized in the combustion of the fragmented combustible material and for combustible gases evolved during combustion of the fragmented combustible material, and egress for gaseous combustion products, said plurality of combustion elements comprising a plurality of sectors which when joined in a particular configuration, define an axially symmetric body having a channel formed therein.

2. Combustion apparatus according to claim 1 and wherein said combustion elements comprise a plurality of sectors, which when joined in a particular configuration, define a cylinder having a channel formed therein.

3. Combustion apparatus according to claim 1 and wherein said combustion elements comprise a plurality of sectors, which when joined in a particular configuration, define a polyhedron having a channel formed therein.

4. Combustion apparatus according to claim 1 wherein the combustible enclosure means comprises a wrapping material.

5. Combustion apparatus according to claim 1 wherein said fragmented combustible material has not been compressed.

6. Combustion apparatus according to claim 1 and wherein said channel is vertically oriented.

7. Combustion apparatus according to claim 1, wherein said combustible enclosure means comprises a coating formed at the outer surface only of said element.

8. Combustion apparatus according to claim 7, wherein said coating comprises a thermoplastic resin.

* * * * *